Oct. 25, 1932.  F. STONER  1,884,908
INDUSTRIAL TRUCK
Filed Oct. 9, 1929   8 Sheets-Sheet 2

FIG.2

Inventor.
Frank Stoner
By Geo. B. Pitts
ATTORNEY

Oct. 25, 1932.  F. STONER  1,884,908
INDUSTRIAL TRUCK
Filed Oct. 9, 1929  8 Sheets-Sheet 3

INVENTOR
Frank Stoner
BY
Geo. B. Pitts
ATTORNEY

Oct. 25, 1932.  F. STONER  1,884,908
INDUSTRIAL TRUCK
Filed Oct. 9, 1929   8 Sheets-Sheet 7

INVENTOR
Frank Stoner
By
Geo. B. Pitts
ATTORNEY

Patented Oct. 25, 1932

1,884,908

UNITED STATES PATENT OFFICE

FRANK STONER, OF LAKEWOOD, OHIO, ASSIGNOR TO THE BAKER-RAULANG COMPANY, OF CLEVELAND, OHIO, A CORPORATION OF OHIO

INDUSTRIAL TRUCK

Application filed October 9, 1929. Serial No. 398,388.

This invention relates to an industrial truck capable of lifting, lowering and transporting loads.

One object of the invention is to construct a truck of this character in which the elevating member is movable vertically and laterally, whereby the engagement and discharge of loads is greatly facilitated and the range of operations under varying conditions increased.

Another object of the invention is to provide, in a truck having an elevating device and a load carrier capable of movement laterally, improved means for operating and controlling said carrier and its operating means.

Other objects of the invention will be apparent to those skilled in the art to which my invention relates from the following description taken in connection with the accompanying drawings, wherein.

In the drawings, 1 indicates a frame mounted on suitable wheels, certain of which are driven by a motor 2, transmitting power through a suitable transmission mechanism within a housing 3. The frame preferably comprises an elevated section 1a and a drop section 1b. In this form of construction a pair of relatively large wheels 4 are arranged below the elevated section 1a and relatively small wheels 5 are arranged below the drop section. In this arrangement the wheels 4 serve as the traction wheels driven by the transmission mechanism.

Figure 7:
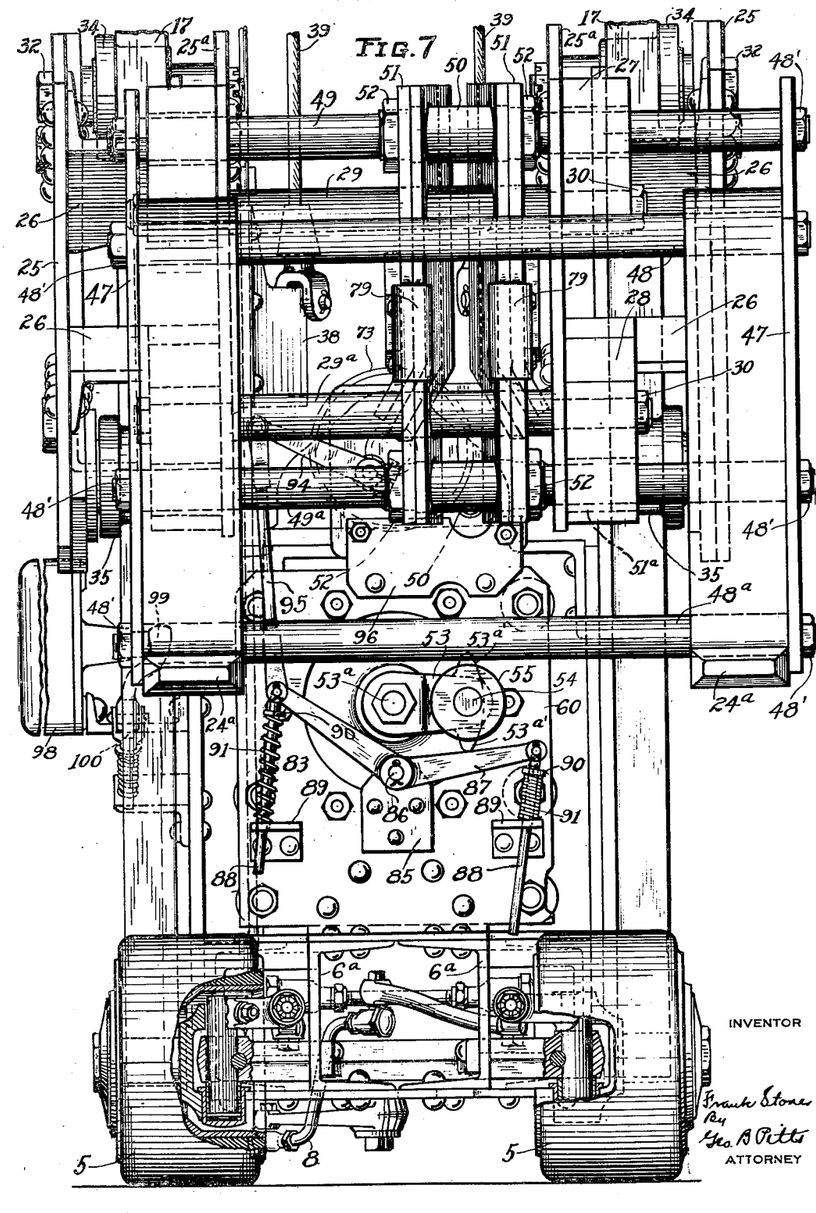
Fig. 7 is a view similar to Fig. 3, but showing the elevating member raised and moved laterally; parts being broken away.

The section 1b is connected to the section 1a by drop plates 6. The section 1b consists of sills 6a, the outer ends of which are preferably brought together (see Figs. 3 and 7), so that the wheels 5 may be disposed on their outer sides but within the planes of the wheels 4.

7 indicates a suspension mechanism for the motor 2 and housing 3 and comprising a pair of U-members, one of said members being shown trunnioned at 7a on the plates 6. The suspension mechanism is preferably similar to that shown and claimed in Letters Patent No. 1,628,145, dated May 10, 1927. 8 indicates a steering gear preferably connected to both pairs of wheels 4, 5, and simultaneously steering them about a common center by means of a manual steering device 8a. 9 indicates a suitable controller for completing the circuits to the motor, current being supplied by suitable batteries 9a. The controller 9 is connected by a linkage 10 to an operating lever 11, supported on uprights 12. The uprights 12 are fixed to the frame section 1a by gussets 13 and at their lower ends pivotally support a platform 14 for an operative. 15 indicates a foot pedal associated with the platform 14 and operating through a linkage to control a brake mechanism 16 which is normally biased into braking position by a spring as is customary in trucks of this general character.

Figure 1:
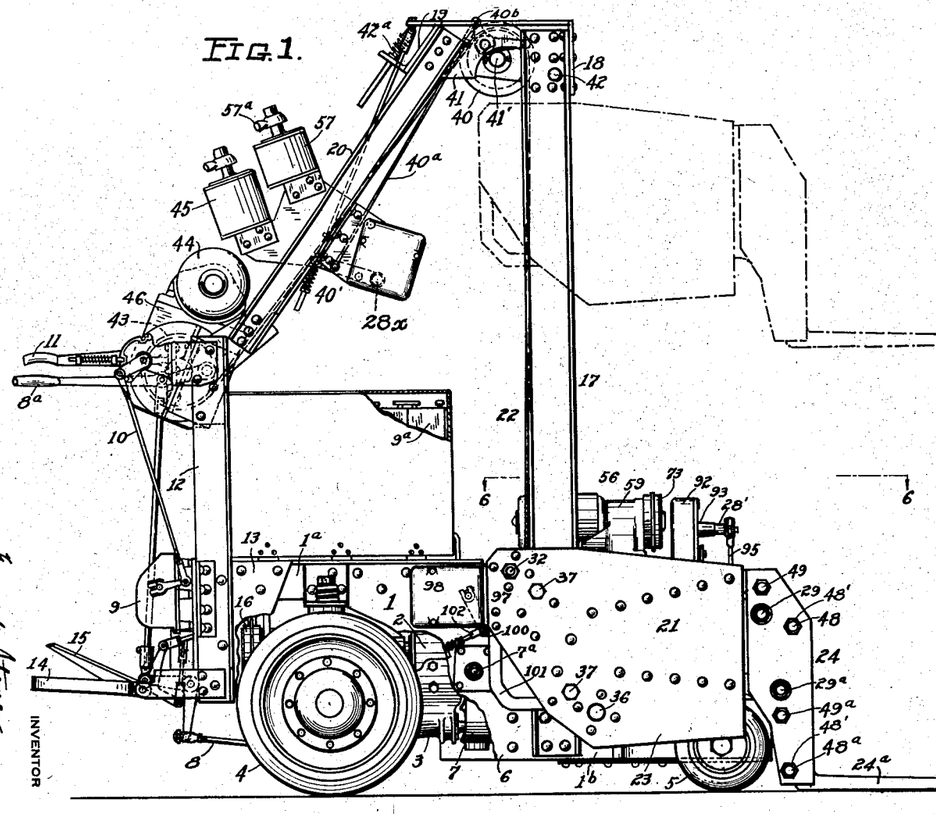
Fig. 1 is a side elevation of a truck embodying my invention, parts being broken away.
Figure 2:
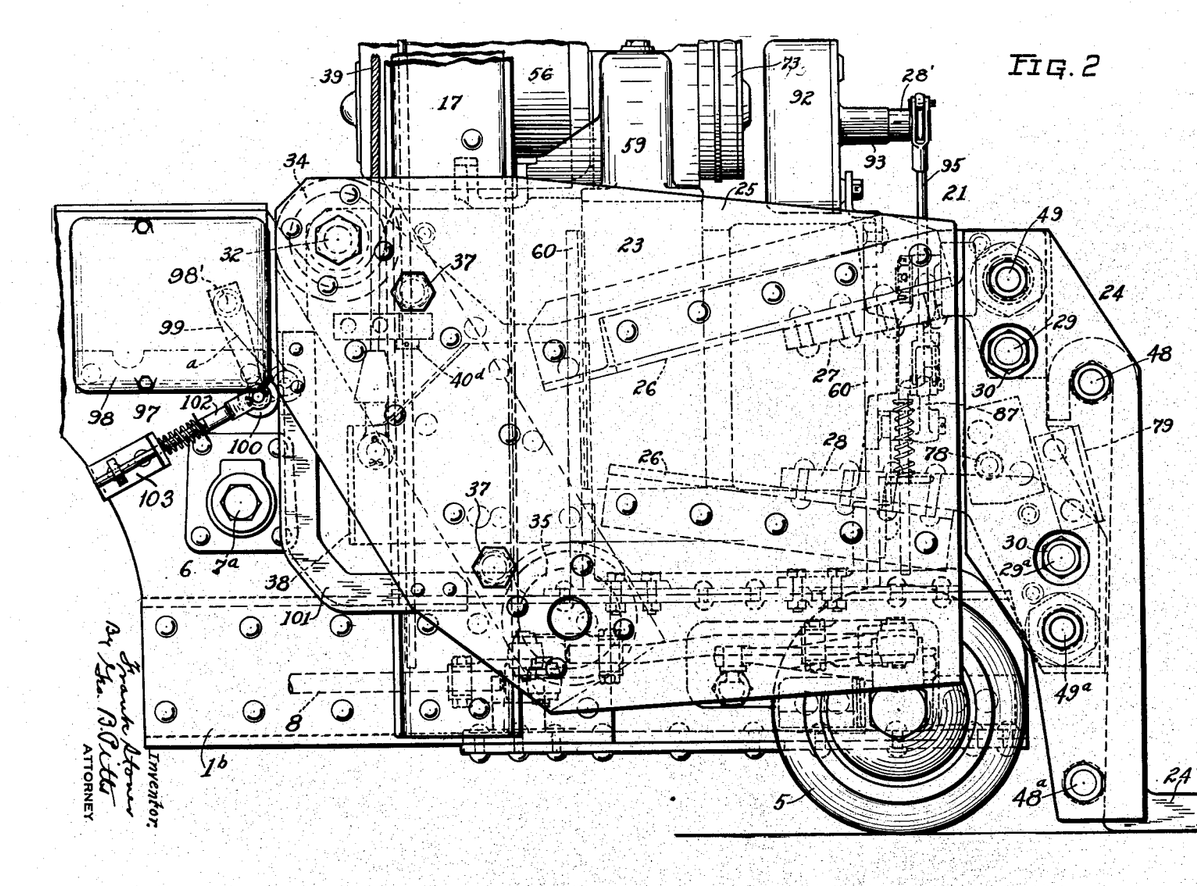
Fig. 2 is a fragmentary side elevation of parts shown in Fig. 1, somewhat enlarged.
Figure 6:
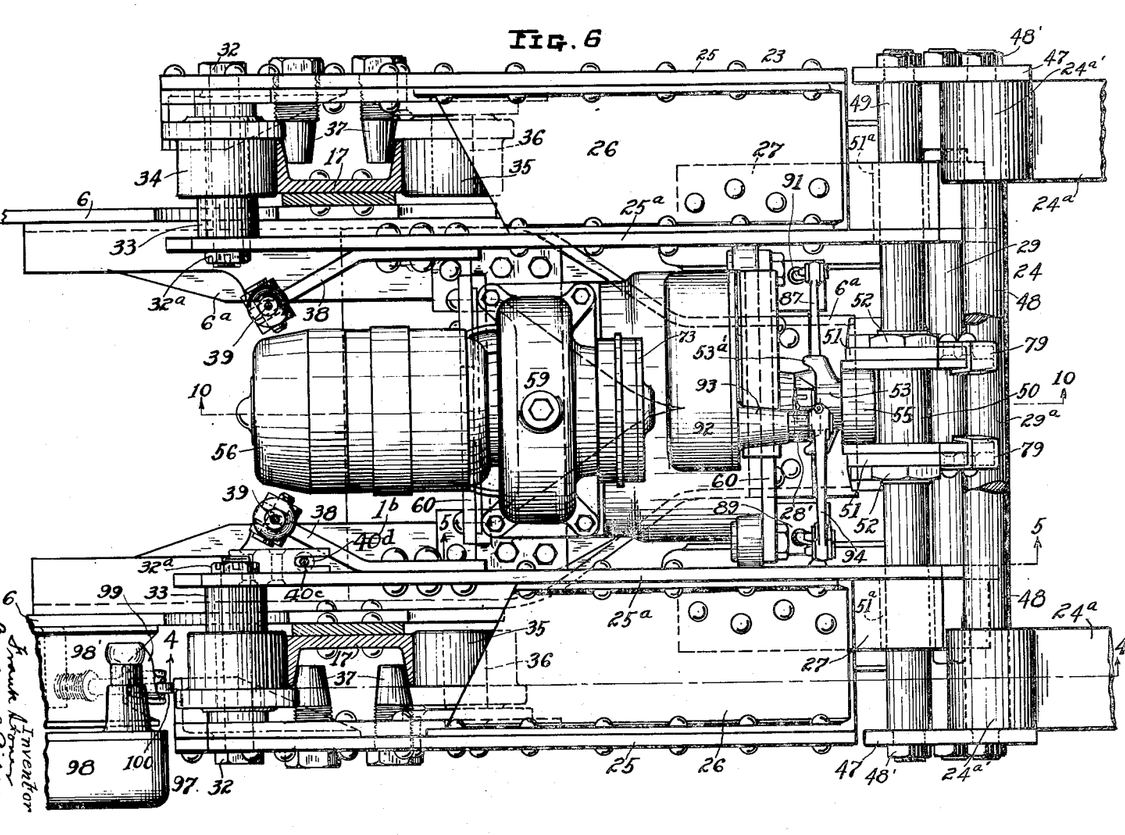
Fig. 6 is a section on the line 6—6 of Fig. 1.

17 indicates a guide frame preferably comprising a pair of spaced channels secured at their lower ends to the drop plates and the sills 6a (see Figs. 1, 2 and 6). The upper ends of the guides are connected together by a cross plate 18 and also connected by brackets 19 to a pair of bracing members 20, which are connected at their lower ends to suitable brackets fixed to the uprights 12.

21 indicates as an entirety an elevating device or carriage movably engaging with and supported by the guide frame 17 and adapted to be raised and lowered thereon by a hoist mechanism indicated as an entirety at 22. The elevating device 21 comprises a raising and lowering member 23 which slides on the channels 17 and a load engaging and carrying member or carrier 24 which is movable from a mid position laterally in opposite directions on the member 23. By this arrangement the load carrying member may be positioned to (a) engage a load when the driver fails to drive the truck into operative position, without further maneuvering the truck and (b) discharge a load in a predetermined position when the truck is not properly positioned without maneuvering the truck. For example, with the elevating device 21 in the position shown in Fig. 1, the truck is driven forwardly to project the load supporting elements 24a below the load, so that upon the raising of the member 23 the load will be lifted from its support (floor); if in such operation of the truck the operative fails to so project the lifting elements below the load that on lifting the elevating device and carrier, the load would be stabilized and balanced, or the elements 24a are not properly located between the dunnage for the load, then the operative may move the member or carrier 24 laterally in either direction until proper positioning of the lifting elements with respect to the load is insured. Likewise, in discharging a load the member 24 may be moved laterally to insure its discharge in a predetermined position, where the driver failed to drive the truck into the desired position. Such lateral adjustment of the member 24 on the member 23 also permits loads to be positioned in close relation side by side as well as one in front of another; this arrangement being particularly advantageous in loading warehouses and carriers, such as freight cars, to full capacity; and the mechanism is equally advantageous in unloading or removing loads so packed in warehouses and carriers.

Figure 4:
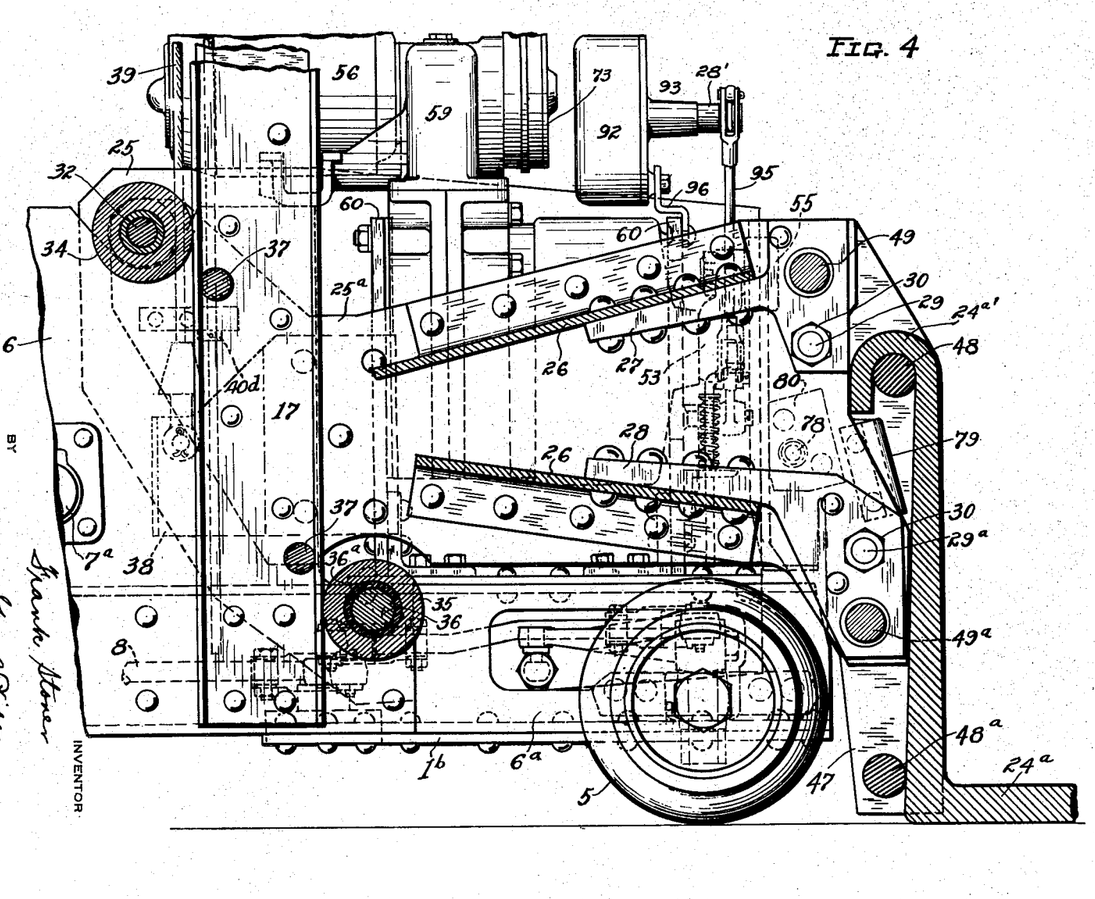
Fig. 4 is a section on the line 4—4 of Figs. 3 and 6.

The raising and lowering member 23 preferably comprises two pairs of spaced plates 25—25a, 25—25a, held in fixed spaced relation, the plates of each pair being disposed upon opposite sides of one guide channel 17. The plates 25—25a of each pair are secured together at their outer portions by sections of channel bar 26, the flanges of which are riveted to the opposing faces of the plates, these bars also being secured to castings 27, 28, secured to the outer faces of the plates 25a, and the plates 25a, 25a, are secured together at their outer portions by rods 29, 29a, extending through openings formed in the castings 27, 28, and plates 25a. The rods 29, 29a, are reduced at their outer portions to fit into and through these openings and to form shoulders against which the castings and plates are clamped by nuts 30 threaded on the ends of the rods and tightened against the plates. At their rear ends, the plates 25—25a of each pair are secured together in spaced relation by a bolt or pin 32, extending through aligned openings in the plates, a sleeve 33 being positioned on the bolt 32 between the plates and a nut 32a being threaded on the end of the bolt and clamping the plates against the sleeve ends. The sleeve 33 serves as a bushing for a flanged roller 34 which rolls on the innerside of the adjacent channel 17. The rollers 34 co-operate with flanged rollers 35 to slidably support the elevating device on the guide channels 17. Each roller 35 is supported on a stud shaft 36 mounted in the adjacent plate 25 and extending inwardly therefrom, the shaft being provided with a bushing 36a on which the roller loosely rotates (see Fig. 4). 37 indicates a pair of pins mounted in each plate 25 and extending inwardly therefrom. The inner ends of the pins 37 are disposed in close relation to the inner walls of the channel flanges and each pin is located in operative relation with one of the rollers 34 or 35 (see Fig. 4). The pins 37 serve to prevent the elevating device from getting out of alignment with the guide channels or from swinging relative thereto, should it engage an obstruction in its downward movement.

The inner plates 25a are provided at their inner ends with arms 38 to which are pivotally secured clevises carried on the outer or free ends of hoisting members 39, such as steel cables, constituting parts of the hoisting mechanism 22. The cables 39 run over guide sheaves 40 (one being shown in Fig. 1) mounted in a cradle 41, which is swingable on a transverse shaft 42; the shaft being supported by the guides 17. The cradle 41 carries a rock shaft having laterally extending studs 41' on which the sheaves 40 rotate. The cradle 41 is pressed downwardly by the pull on the cables 39 against the tension of compression springs 42a, which operate to lift the cradle about the shaft 42 should slack occur in the cables or either thereof. The slack take-up mechanism, of which the cradle is a part, and the means for operating a limit switch mechanism (indicated as an entirety at 40'), form the subject-matter of a co-pending application Serial No. 281,704, filed by Edward H. Remde, of Cleveland, Ohio, for which reason no claim is made herein to such subject-matter. From the sheaves 40, the cables extend to a pair of drums 43 (one being shown in Fig. 1) on which they wind or unwind. The drums 43 are driven in either direction by an electric motor 44 that is supplied by current from the batteries 9a; a suitable controller 45 being provided to control the supply of current to the motor. The drums 43 are driven by the motor 44 through suitable transmission mechanism, enclosed in a housing 46. The housing is secured to the uprights 12. The limit switch mechanism is preferably similar to the mechanism disclosed in Letters Patent No. 1,726,717, dated September 3, 1929, and is operated to open the circuit to the motor 44 by a rod 40a, connected through a bell crank 40b to a rod 40c. The rod 40c is disposed parallel to the guides and carries adjustable tappets 40d arranged to be engaged by the member 23 when approaching its limit of movement in either direction.

The load engaging and carrying member or carrier 24 comprises a pair of plates 47, preferably connected in rigid, spaced relation by a plurality of tie members or rods. In the construction shown I provide upper and lower connecting rods 48, 48a disposed outwardly of the connecting rods 29, 29a, and upper and lower connecting rods 49, 49a, which also serve as elements for slidably supporting the member 24 on the movable member 23 and guiding the member 24 laterally thereon. The rods 48, 48a, have reduced ends fitting into and through openings in the plates 47, nuts 48' on the ends thereof serving to clamp the plates against the shoulders formed by such reduced ends. The combined supporting and guiding rods 49, 49a, are similarly connected to the plates 47, but their central portions are preferably enlarged as shown at 50, to facilitate the positioning on the rods of thrust plates 51, to which reference will later be made. The opposite ends of the enlarged portions on the rods 49, 49a, are stepped (see dotted lines in Fig. 7) to form shoulders against which the plates 51 are clamped by nuts 52 threaded on the stepped portions.

As shown, the rods 49, 49a extend through and have bearing in the walls of openings formed in the plates 25a and castings 27, 28, the rods having a sliding fit with these walls so that they may slide endwise therein in either direction when power is applied in the manner to be later set forth. The openings in the castings may be provided with suitable bushings 51a. The means for moving the member 24 laterally in either direction comprises an arm or crank 53, which is preferably connected to a power driven shaft 53a rotatably mounted on the frame 1 in the illustrated form of construction. In the preferred arrangement the thrust plates 51 are mounted on the rods 49, 49a. The crank 53 carries on its outer end a pin or shaft 54 on which is loosely mounted a roller 55. The roller 55 rolls on the plates (or interposed plates 51' constituting locking devices to be later described) as the crank revolves and transmits movement through them to the rods 49, 49a, to move the member 24 laterally. The shaft 53a is driven by a suitable mechanism as follows: 56 indicates an electric motor receiving current from the batteries 9a. The current to the motor is controlled by a controller 57 having an operating handle 57a. The motor is secured to a cradle 58, which forms part of a sectional housing 59. The housing is secured to and disposed between a pair of up-standing plates 60 suitably secured to the frame section 1b. The motor shaft 56a carries a pinion 61 which transmits power through a speed reducing gear train comprising gears 62, 63, 64, 65, 65a, the latter being secured to a shaft 66. The shaft 66 carries a pinion 67 which meshes with a series of planetary gears 68 loosely mounted on stud shafts 69 carried by the enlarged portion 70 of the shaft 53a and these gears 68 mesh with a stationary ring gear 71 to effect a further gear reduction. The motor shaft 56a has an extended outer end carrying a friction disk 72, which is free to move slightly on the shaft end. The disk 72 is interposed between the stationary wall 73, forming a cover for the chamber enclosing the disk, and a non-rotative annular plate 74 (formed of soft iron) slidable on the securing bolts 75. 76 indicates an annular coil seated in the inner wall of the chamber and connected in series with the motor 56. 77 indicates springs (only one being shown in Fig. 10) normally pressing the plate 74 outwardly to cause frictional engagement with the disk 72 and frictional engagement between the disk and the wall 73, whereby the motor shaft 56a and elements in driving connection therewith are braked; but upon the supply of current to the motor, the coil will become energized and attract the plate 74 and effect a release of this braking action.

By reason of the fact that the shaft 53a is mounted on the frame 1, it will be noted that the thrust plates 51 are disposed in operative relation with the operating crank 53 in one predetermined position of the raising and lowering member 23 along the guides 17. As the shaft 53a is mounted on the low frame section 1b, the thrust plates 51 preferably occupy this operative relation when the member 23 is near its lowest position and move out of such relation when this member is elevated (see Fig. 7).

The load supporting and lifting elements 24a may comprise a pair of L-shaped members the vertical portions of which are provided with hooks 24a'. The hooks 24a' adjustably and removably engage the rod 48, so that the vertical portions of the L-members depend therefrom and bear at their lower ends against the rod 48a.

The plates 51 and 51' extend inwardly, and overlap a portion of the roller 55 to permit the plates to move into and out of engagement of operative relation to the roller without danger of the latter engaging the rods 49, 29. The plates 51, 51', are preferably inclined outwardly at their lower ends, so that in the downward movement of the member 23, the roller will be guided in between the plates. As I interposed a spring 78 between each plate 51 and the adjacent plate 51', it will be seen that the plates 51' may yield slightly as engagement with the roller takes place. As the plates 51' are released from the rods 29 when engaging the roller, as will be later set forth, if any disalignment is present when the plates move into the operative relation therewith, the roller will act on the inclined portions to effect an adjustment of the carrier so that the plates may move downwardly at either side of and straddle the roller.

In operation, the member 23 is raised and lowered in the usual manner by means of the hoist mechanism 22, carrying with it the member 24. However, upon driving of the truck forward toward the load pick-up position, if it is found that the load is at one side of the central longitudinal plane of the truck, then the shaft 53a is rotated to move the member 24 laterally to position the supporting and lifting elements 24a in alignment with the load; the truck is then driven into its load pick-up position after which the member 24 is elevated; if it is desired to center the load on the truck prior to transporting it to its place of discharge, the member 23 is lifted a slight distance to clear the load from the floor and then the member 24 is moved back to its mid position, the plates 51, 51' being elongated so that the member 24 may be raised a short distance without moving the plates out of operative relation to the roller 55. After the load is transported to its place of discharge, if it is found necessary to shift it laterally, the elevating member is lowered to the predetermined position required to bring the plates into operative relation with the roller 55 and then the crank 53 is operated in the desired direction to move the member laterally the desired distance, following which the member 23 is lowered or elevated (as the case may be) and the load discharged. Like operations are carried out when the load to be picked up is on an elevated support and it is found necessary to shift the member 24 laterally before proper engagement with the load can be effected.

It will be understood that the pairs of plates 51 being rigidly secured to the rods 49, 49a, take the thrust of the roller 55, when revolved by the crank 53, to move the carrier 24 laterally and that the plates 51' serve as clutch elements to engage the rods 29, 29a, to normally lock the carrier against lateral movement, each plate 51' being normally biased into locking position by a spring 78. By positioning the plates 51' on the inner sides of the plates 51, the plates 51' are engaged by the roller 55, when the elevating member and carrier move downwardly, and automatically disengaged thereby from clutching engagement with the rods 29, 29a. When the carrier is in a raised position, with the plates 51—51', 51—51' out of engagement with the roller 55, it is locked by the plates 51'; and when the carrier is in lowered position, lateral movement is prevented by the braking action of the elements 72, 73, 74, already described.

Figures 10, 11, 12:
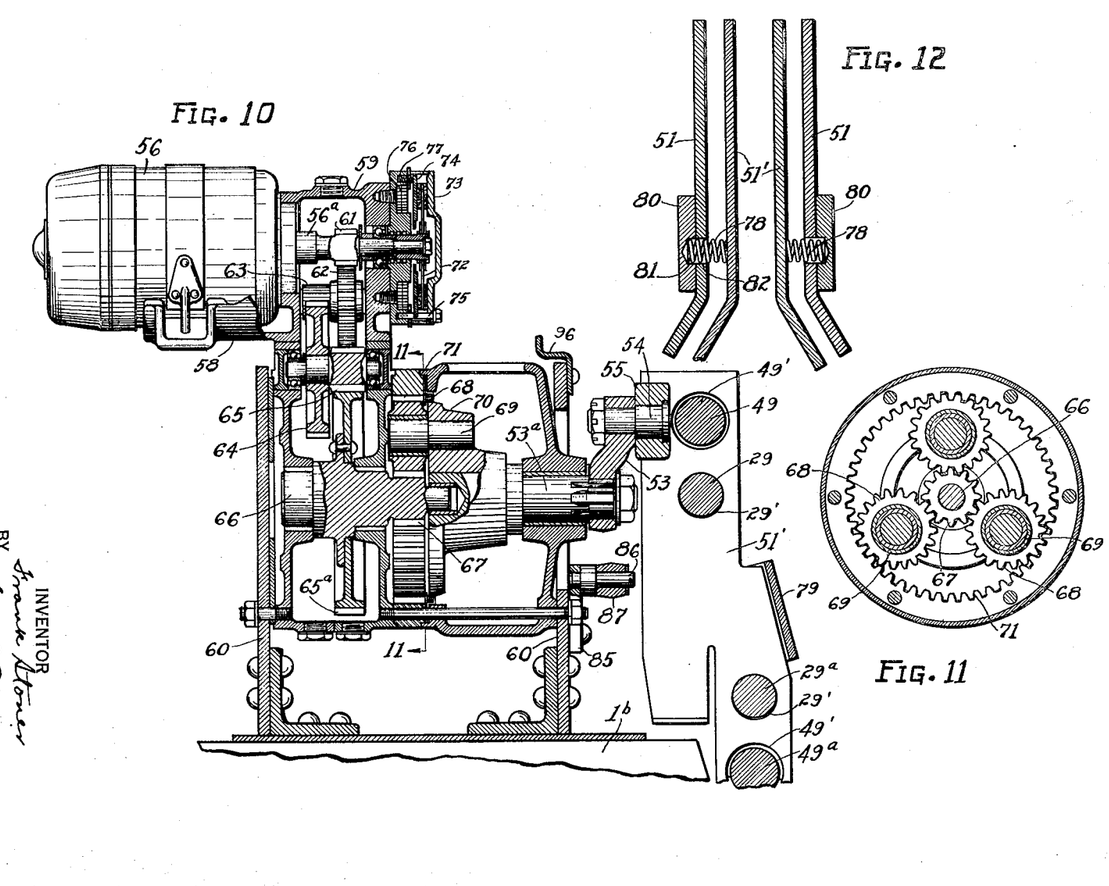
Fig. 10 is a fragmentary section on the longitudinal axis of the frame and as shown on the line 10—10 of Fig. 3.
Fig. 11 is a section on the line 11—11 of Fig. 10.
Fig. 12 is a section on the line 12—12 of Fig. 9.

By reference to Fig. 10, it will be noted that each plate 51' is formed with four openings 29', 29', 49', 49', through which the rods 29, 29a, 49, 49a, extend respectively. The openings 29' for the rods 29, 29a, have a diameter slightly larger than the rods to permit the plate to swing laterally or toward the other plate at its inner edge to cause engagement between opposite side walls of the openings 29' and the rods 29, 29a, under the influence of the springs 78, thereby effecting a clutch engagement with the rods. The openings 49' have a relatively large diameter so that in the swinging of the plates 51' their side walls do not engage with the rods 49, 49a. Both plates 51' are similarly constructed and mounted and are normally swung inwardly by the springs 78 toward each other (see Fig. 9) into clutching engagement with the rods 29, 29a, to thereby lock the member 24 against lateral movement in either direction. The upper walls of the openings 29' for the rods 29, 29a, rest on the latter to support them in position, whereas their outer ends are mounted in yokes 79, carried by the adjacent ends of the plates 51. Each plate 51 is provided with a wall 80 having a recess 81 registering with an opening 82 formed in the plate. The recess 81 and opening 82 form a pocket for one of the expansion springs 78, the outer end of which bears on and normally acts to swing the inner portion of the adjacent plate 51' about its outer or yoke supported edge. From the foregoing description it will be seen that the plates 51' serve as locking devices to prevent lateral movement of the member 24 and automatically lock it when the member 23 is elevated and automatically release it when the plates 51 move into operative relation to the crank 53.

Figure 3:
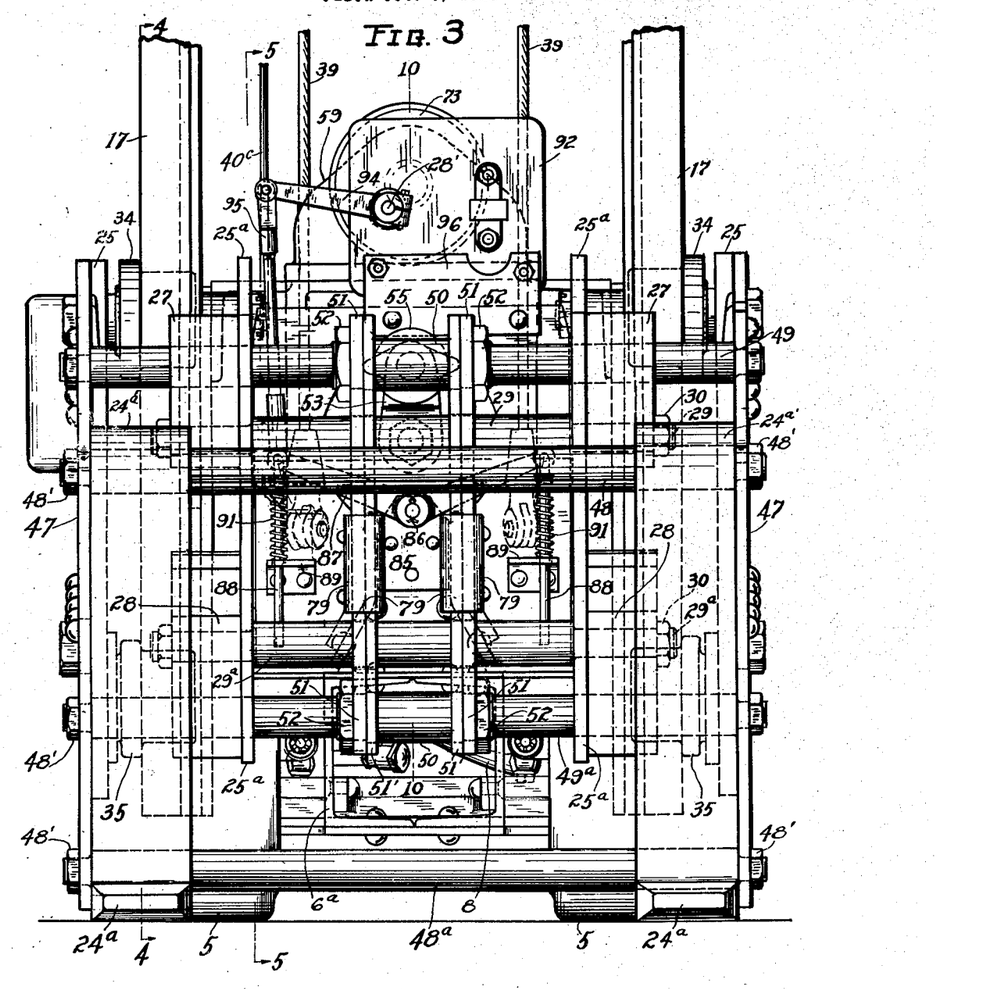
Fig. 3 is a front view of the parts shown in Fig. 2.

In the form of operating mechanism herein illustrated for moving the member 24 laterally on the elevating member 23, I provide a revolving crank 53 which in moving from its vertical position to its horizontal position, through an angular distance of 90 degrees, will move the member 24 the extreme distance laterally, and if revolved more than 90 degrees it will move the member in the opposite direction or inwardly. To avoid such return movement, by the revolving of the crank in the same direction, as well as to provide an index for the operative whereby he may know when the extreme movement of the carrier in either direction has been reached, I provide a switch mechanism, indicated as an entirety at 83, under the control of the crank 53, which serves to open the circuit to the motor 56 and stop it when the member 24 reaches the end of its movement laterally in either direction, that is, when the crank 53 has revolved in either direction 90 degrees from its starting position (see Fig. 3) to its horizontal position, (one such position being shown in Fig. 7). Of the mechanism 83, 85 indicates a bracket mounted on the outer upstanding plate 60. The bracket 85 carries a stud shaft 86. 87 indicates a bell crank fulcrumed on the shaft 86. To the free ends of the bell crank arms are pivotally connected rods 88 the lower ends of which slide and swivel in openings formed in brackets 89 also by preference carried by the plate 60. Between each bracket and a collar 90 fixed to the upper end of the adjacent rod is a compression spring 91, coiled around the rod, which spring, in cooperation with the spring around the other rod 88, serves to maintain the bell crank in neutral position, that is, with both its arms in the path of movement of the crank 53, or lugs 53a' thereon, so that when the crank 53 revolves a quarter turn, or 90 degrees, in either direction it will engage with one arm of the bell crank and operate it against the tension of the adjacent spring 91. As shown, the stud shaft 86 is mounted in the vertical plane cutting the axis of the shaft 53a and below it, and the bell crank arms extend upwardly to either side of the shaft in the path of movement of the lugs 53a', so that one or the other arm of the bell crank will be operated by the crank when or in the event it moves 90 degrees in either direction from its normal or mid position as shown in Fig. 3. 92 indicates a casing enclosing a switch mechanism which is operated by the lever 87 when rocked in either direction.

Figures 5, 8, 9:
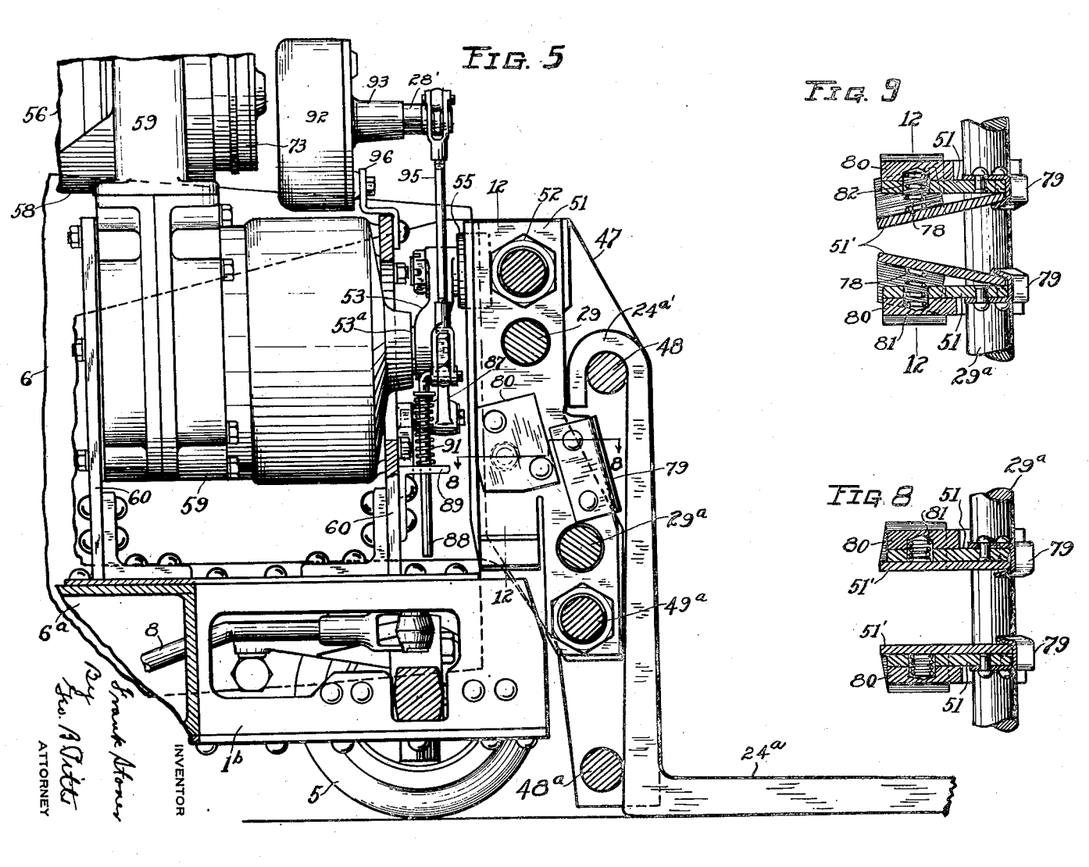
Fig. 5 is a section on the line 5—5 of Figs. 3 and 6.
Fig. 8 is a section on the line 8—8 of Fig. 5.
Fig. 9 is a section similar to Fig. 8, but showing the locking means in normal or locking position.

The switch mechanism comprises a pair of switches interposed in the motor circuit so that when the motor 56 is rotating in either direction, the circuit is completed through one of said switches. The switch mechanism is preferably similar to the switch mechanism described and claimed in the aforesaid Letters Patent No. 1,726,717, and having a rock shaft 28' corresponding to the rock shaft 28a mounted in the hollow boss 93 (Figs. 5 and 6). The rock shaft 28' carries an arm 94 to which one end of a link 95 is pivotally connected, the other end of the link being pivotally connected to the adjacent arm of the bell crank 87. The casing 92 is supported by a bracket 96, fixed to the upper end of the outer plate 60.

In my preferred form of construction the entire mechanism for moving the load engaging and carrying member 24 laterally is supported on the low frame section 1b. In this arrangement the center of gravity is close to the surface or flooring, danger of tipping is reduced, strains on the frame are eliminated and the weight of this mechanism does not have to be raised and lowered by the hoist means 22, which insures a great saving in cost and consumption of electric current, all of which tends to increase the life of the truck equipment and to facilitate its speed of operation. Furthermore, in this arrangement, as already described, the load engaging and carrying member 24, when elevated by the elevating member 23, is moved out of operative relation to the operating crank 53 and is moved into such operative relation when the elevating member is lowered. As the crank 53, or roller 55 thereon fits between and acts upon the plates 51 to move the member 24, it will be seen that the plates 51 and roller 55 must maintain a predetermined aligned relation when the member 24 is carried upwardly so that when it is lowered the plates 51 will move down into their operative relation with respect to the roller 55 in position to be engaged thereby. To accomplish this result I provide means for preventing movement of the crank 53 when the plates 51 move out of engagement with the roller 55; accordingly when these plates move downwardly, the roller 55 will be aligned with the space between the plates 51. The means for preventing movement of the crank 53 consists of a cut out mechanism indicated as an entirety at 97 and having a switch interposed in the motor circuit, such mechanism being controlled by the raising and lowering of the elevating member 23. Of the mechanism 97, 98 indicates a casing enclosing a switch interposed in the motor circuit and when opened prevents rotation of the motor 56 in either direction. The switch and its operating means may be similar to corresponding parts shown in the aforesaid Letters Patent No. 1,726,717. The operating means within the casing is operated by a rock shaft 98' to which is secured an arm 99. The outer end of the arm 99 carries a roller 100 which rides on a cam 101 carried by the lower end of the adjacent plate 25 of the elevating member 23. When the member 23 is lowered, as shown in Figs. 1, 2, 3, 4, 5 and 6, the arm 99 is rocked to the position indicated at a, against the opposition of a spring actuated rod 102, such movement serving to close the switch in the casing 98, but when the member 23 is elevated, the rod 102 will swing the arm 99 to its other position (shown in dotted lines in Fig. 2) and open the switch, so that the motor 56 cannot be driven in either direction. The rod 102 is pivotally connected at its outer end on the shaft for the roller 100. The inner end of the rod 102 loosely slides in an opening formed in a bracket 103; the bracket being secured to the adjacent drop plate 6. It will therefore be seen that when the plates 51 move out of operative relation to the crank 53, due to the raising of the member 23, the member or carrier is automatically locked to the rods 29, 29a, and the motor circuit is automatically opened so that the crank cannot be moved by operation of the controller 57; but upon the lowering of the member 23, the plates 51' are released automatically and the switch automatically closed, thereby making the controller operative.

The cam 101 is positioned to permit swinging of the arm 99 under the influence of the thrust rod 102 simultaneously with the disengagement of the plates 51 from the roller 55. As a result of this construction and arrangement, the roller 55 will be in alignment with the space between the plates 51 in each lowering movement of the member 23.

To those skilled in the art to which my invention relates, many changes in construction and widely differing embodiments and applications of the invention will suggest themselves without departing from the spirit and scope thereof. My disclosures and the description herein are purely illustrative and not intended to be in any sense limiting.

What I claim is:

1. In apparatus of the class described, the combination of a wheel mounted frame having guides, a member slidable on said guides, means for raising and lowering said slidable member, a load engaging and carrying member slidably mounted on said first mentioned member to move laterally in either direction from the longitudinal axis of the frame, and means for moving said last mentioned member laterally, said means including a power operated element mounted on said frame and arranged to have operative relation to said load engaging and carrying member in a lowered position only of said first mentioned member.

2. In apparatus of the class described, the combination of a wheel mounted frame having guides, a member slidable on said guides, means for raising and lowering said slidable member, a load engaging and carrying member slidably mounted on said first mentioned member to move laterally in either direction from the longitudinal axis of the frame, and means for moving said last mentioned member laterally, said moving means being mounted on said frame and arranged to move said member when said first mentioned member is in a single predetermined position on said guides.

3. In apparatus of the class described, the combination of a wheel mounted frame having an elevated section and a relatively low section, vertical guides on said frame, a member slidable on said guides, means for raising and lowering said member, a load engaging and carrying member mounted on said first mentioned member to move laterally in either direction from the longitudinal axis of the frame, and means on said low frame section for moving the last mentioned member laterally when said first mentioned member is in a single predetermined position.

4. In apparatus of the class described, the combination of a wheel mounted frame having guides, a member slidable on said guides, means for raising and lowering said slidable member, a load engaging and carrying member slidably mounted on said first mentioned member to move from a mid position laterally in either direction, and means on said frame for moving said last mentioned member laterally, said moving means comprising a revoluble element arranged to engage a portion of said last mentioned member when said first mentioned member is in a predetermined position on said guides.

5. In apparatus of the class described, the combination of a wheel mounted frame having guides, an operating device movably mounted on said frame, a member slidable on said guides, means for raising and lowering said member, a load carrier movably mounted on said member and provided with means arranged to be engaged and operated by said operating device, when said member is moved along said guides to a predetermined position, to move said load carrier laterally on said member, and means for operating said device.

6. In apparatus of the class described, the combination of a wheel mounted frame having guides, an operating device movably mounted on said frame, a support slidably engaging said guides, a load carrying member mounted on said support to slide laterally, means on said member co-operable with said device when said support is in a predetermined position, whereby said device, when operated, moves said member laterally, mechanism for moving said support along said guides, whereby said means are moved into and out of operative relation to said device, and means for operating said device.

7. In apparatus of the class described, the combination of a wheel mounted frame having guides, an operating device movably mounted on said frame, a support slidably engaging said guides, a load carrying member mounted on said support to slide laterally, means on said member co-operable with said device when said support is in a predetermined position, whereby said device, when operated, moves said member laterally, mechanism for moving said support along said guides, whereby said means are moved into and out of operative relation to said device, means for operating said device, and means for locking said member to said support when said first mentioned means move out of operative relation to said device.

8. In apparatus of the class described, the combination of a wheel mounted frame having guides, an operating device movably mounted on said frame, a support slidably engaging said guides, a load carrying member mounted on said support to slide laterally, means on said member co-operable with said device when said support is in a predetermined position, whereby said device, when operated, moves said member laterally, mechanism for moving said support along said guides, whereby said means are moved into and out of operative relation to said device, means for operating said device, and means for preventing movement of said device when said first mentioned means moves out of operative relation to said device.

9. In apparatus of the class described, the combination of a wheel mounted frame having guides, an operating device movably mounted on said frame, a support slidably engaging said guides, a load carrier mounted on said support to slide laterally, means on said carrier arranged to be engaged by said device when said support is in a predetermined position, whereby said device, when operated, moves said carrier laterally, mechanism for moving said support along said guides, whereby said means are moved into and out of operative engagement with said device, means for operating said device, means for locking said carrier to said support when said first mentioned means move out of operative engagement with said device, and means for preventing movement of said device when said first mentioned means moves out of operative engagement with said device.

10. In apparatus of the class described, the combination of a wheel mounted frame having guides, an operating device movably mounted on said frame, a support slidably engaging said guides, a load carrying member mounted on the support to slide laterally, means on said member co-operable with said device when said support is in a predetermined position, whereby said device, when operated, moves said member laterally, mechanism for moving said support along said guides, whereby said means are moved into and out of operative relation to said device, means for operating said device, and means for locking said member to said support when said first mentioned means move out of operative relation to said device, said locking means being controlled by the engagement and disengagement of said device with said first mentioned means.

11. In apparatus of the class described, the combination of a wheel mounted frame having guides, a device revolubly mounted on said frame, a support slidably mounted on said guides, a load carrier mounted on said support to move laterally, mechanism for raising and lowering said support, a pair of spaced walls on said carrier arranged to move into operative relation to and at opposite sides of said device in one position of said support along said guides whereby upon operation of said device about its center of revolution it will engage one of said walls and move said carrier laterally, and means for revolving said device.

12. In apparatus of the class described, the combination of a wheel mounted frame having guides, a device revolubly mounted on said frame, a support slidably mounted on said guides, a load carrier mounted on said support to move laterally, mechanism for raising and lowering said support, a pair of spaced walls on said carrier arranged to move into operative relation to and at opposite sides of said device in one position of said support along said guides whereby upon operation of said device it will engage one of said walls and move said carrier laterally, means for revolving said device, and means carried by said carrier normally operating to lock said carrier to said support but arranged to be acted on by said device when said walls move into operative relation therewith to release said locking means from said support.

13. In apparatus of the class described, the combination of a wheel mounted frame having guides, a device revolubly mounted on said frame, a support slidably mounted on said guides, a load carrier mounted on said support to move laterally, mechanism for moving said support along said guides, a pair of spaced walls on said carrier at opposite sides of said device arranged to move into operative relation to and at opposite sides of said device in one position of said support along said guides, whereby upon operation of said device it will engage one of said walls and move said carrier laterally, means for revolving said device, and means for rendering said revolving means inoperative when said device revolves a predetermined distance.

14. In apparatus of the class described, the combination of a wheel mounted frame having guides, a device revolubly mounted on said frame, a support slidably mounted on said guides, a load carrier mounted on said support to move laterally, thrust means on said carrier arranged to be engaged by said device when revolved to move said carrier laterally, mechanism for moving said support along said guides, whereby said thrust means move into and out of engaging relation with said device, means for revolving said device, means for preventing movement of said carrier laterally when said thrust means and said device are out of engaging relation, and separate means for preventing movement of said device when said thrust means and the latter are out of engaging relation.

15. In apparatus of the class described, the combination of a wheel mounted frame having guides, a device revolubly mounted on said frame, a support slidably mounted on said guides, a load carrier mounted on said support to move laterally, thrust means on said carrier arranged to be engaged by said device when revolved to move said carrier laterally, mechanism for moving said support along said guides, whereby said thrust means move into and out of engaging relation with said device, means for operating said device, means for preventing movement of said carrier laterally when said thrust means and said device are out of engaging relation, and separate means for preventing movement of said device when said thrust means and the latter are out of engaging relation, the means for preventing movement of said device being controlled by said support.

16. In apparatus of the class described, the combination of a wheel mounted frame having guides, a device revolubly mounted on said frame, a support slidably mounted on said guides, a load carrier mounted on said support to move laterally, thrust means on said carrier arranged to be engaged by said device when revolved to move said carrier laterally, mechanism for moving said support along said guides, whereby said thrust means move into and out of engaging relation with said device, means for operating said device, means for preventing movement of said carrier laterally when said thrust means and said device are out of engagement, the means for preventing movement of said carrier being controlled by said device, and separate means for preventing movement of said device when said thrust means and the latter are out of engaging relation.

17. In apparatus of the class described, the combination of a wheel mounted frame having guides, a crank revolubly mounted on said frame, a support slidable on said guides and having upper and lower cross members, a carrier having spaced plates slidably engaging said cross members, a pair of thrust plates on said carrier arranged to straddle said crank when said support moves to a predetermined position along said guides, mechanism for moving said support along said guides, and means for revolving said crank.

18. In apparatus of the class described, the combination of a wheel mounted frame having guides, a crank revolubly mounted on said frame, a support slidable on said guides and having upper and lower cross members, a carrier having spaced plates slidably engaging said cross members, a pair of thrust plates on said carrier arranged to straddle said crank when said support moves to a predetermined position along said guides, mechanism for moving said support along said guides, means for revolving said crank, and cut out devices in the path of movement of said crank and actuated thereby when moved a predetermined distance to stop said revolving means.

19. In apparatus of the class described, the combination of a wheel mounted frame having guides, a crank revolubly mounted on said frame, a support slidable on said guides and having upper and lower cross members, a carrier having spaced plates slidably engaging said cross members, a pair of thrust plates on said carrier arranged to straddle said crank when said support moves to a predetermined position along said guides, mechanism for moving said support along said guides, means for revolving said crank, and spring operated devices carried by said carrier and arranged to engage said cross members to lock the carrier to said support, said devices being associated with said thrust plates and acted on by said crank to release the carrier when the thrust plates straddle said crank.

20. In apparatus of the class described, the combination of a wheel mounted frame, having guides, a crank mounted on said frame to swing from a vertical position in either direction to a horizontal position, a support slidable on said guides, a carrier movable on said support from a mid position laterally in either direction, a pair of plates on said carrier arranged to straddle said crank in one position of said support along said guides, mechanism for moving said support along said guides, means for swinging said crank in either direction, and cut-out devices for stopping said swinging means, said devices including a bell crank fulcrumed in an axis cutting the axis of said crank and having diverging arms either of which is engaged by said crank when it swings a predetermined distance from its vertical position.

21. In apparatus of the class described, the combination of a wheel mounted frame having guides, a support slidable on said guides, means for raising and lowering said support on said guides, a load carrier slidably mounted on said support to move laterally, and means for moving said carrier laterally, the last mentioned means comprising a power operated element and a thrust element, one mounted on said frame and the other mounted on said carrier, the element mounted on said carrier being arranged in engaging relation with said other element when said support is moved to one position in its travel along said guides by said raising and lowering means and arranged out of engaging relation with said other element when said support is moved along said guides to another position.

22. In apparatus of the class described, the combination of a wheel mounted frame having guides, a support slidable on said guides, means for raising and lowering said support on said guides, a load carrier slidably mounted on said support to move laterally, means for moving said carrier laterally, the last mentioned means comprising a power operated element and a thrust element, one mounted on said frame and the other mounted on said carrier, the element mounted on said carrier being arranged in engaging relation with said other element when said support is moved to one position in its travel along said guides by said raising and lowering means and arranged out of engaging relation with said other element when said support is moved along said guides to another position, and means permitting movement of said power operated element only when said elements are in operative relation.

In testimony whereof, I have hereunto subscribed my name.

FRANK STONER.